United States Patent [19]
Zigler

[11] Patent Number: 6,131,815
[45] Date of Patent: Oct. 17, 2000

[54] SLIDE-IN TRAY FOR SCANNING DEVICE

[75] Inventor: Robert A. Zigler, Marysville, Wash.

[73] Assignee: Intermec Technologies Corporation, Everett, Wash.

[21] Appl. No.: 08/939,925

[22] Filed: Sep. 29, 1997

[51] Int. Cl.[7] .................................................. G06K 7/10
[52] U.S. Cl. ................................. 235/472.01; 235/462.43
[58] Field of Search ........................ 235/462.45, 472.01, 235/462.43; 361/684, 685, 686, 679

[56] References Cited

U.S. PATENT DOCUMENTS

| | | | |
|---|---|---|---|
| 5,059,778 | 10/1991 | Zouzoulas et al. | 235/472 |
| 5,115,120 | 5/1992 | Eastman | 235/462.45 |
| 5,572,007 | 11/1996 | Aragon et al. | 235/462.45 |
| 5,576,530 | 11/1996 | Hagerty | 235/472 |
| 5,602,379 | 2/1997 | Uchimura et al. | 235/462.45 |
| 5,663,551 | 9/1997 | Hone et al. | 235/472 |
| 5,818,696 | 10/1998 | Knoop | 361/685 X |

*Primary Examiner*—Karl D. Frech
*Attorney, Agent, or Firm*—Joan H. Pauly

[57] ABSTRACT

A hand-held scanning device, such as a pistol-type bar code reader, has a housing having an outer shell defining an interior space. An outer opening in the shell communicates with the space. A tray has an inner portion and an outer closure portion with a sealing surface. The inner portion is sized and shaped to be introducible into and removable from the interior space through the opening. The outer closure portion is dimensioned to close the opening when the inner portion is in the space. The sealing surface sealingly engages an outer surface of the shell to protect the interior space and a component mounted on the inner portion from environmental contamination. The tray is easily removable from the device housing, and the component is easily demountable, to allow for quick and easy replacement of the component and/or tray. The closure portion may be provided with an access opening for a memory card to provide an interface between the component and other elements of the device carried by the housing.

21 Claims, 3 Drawing Sheets

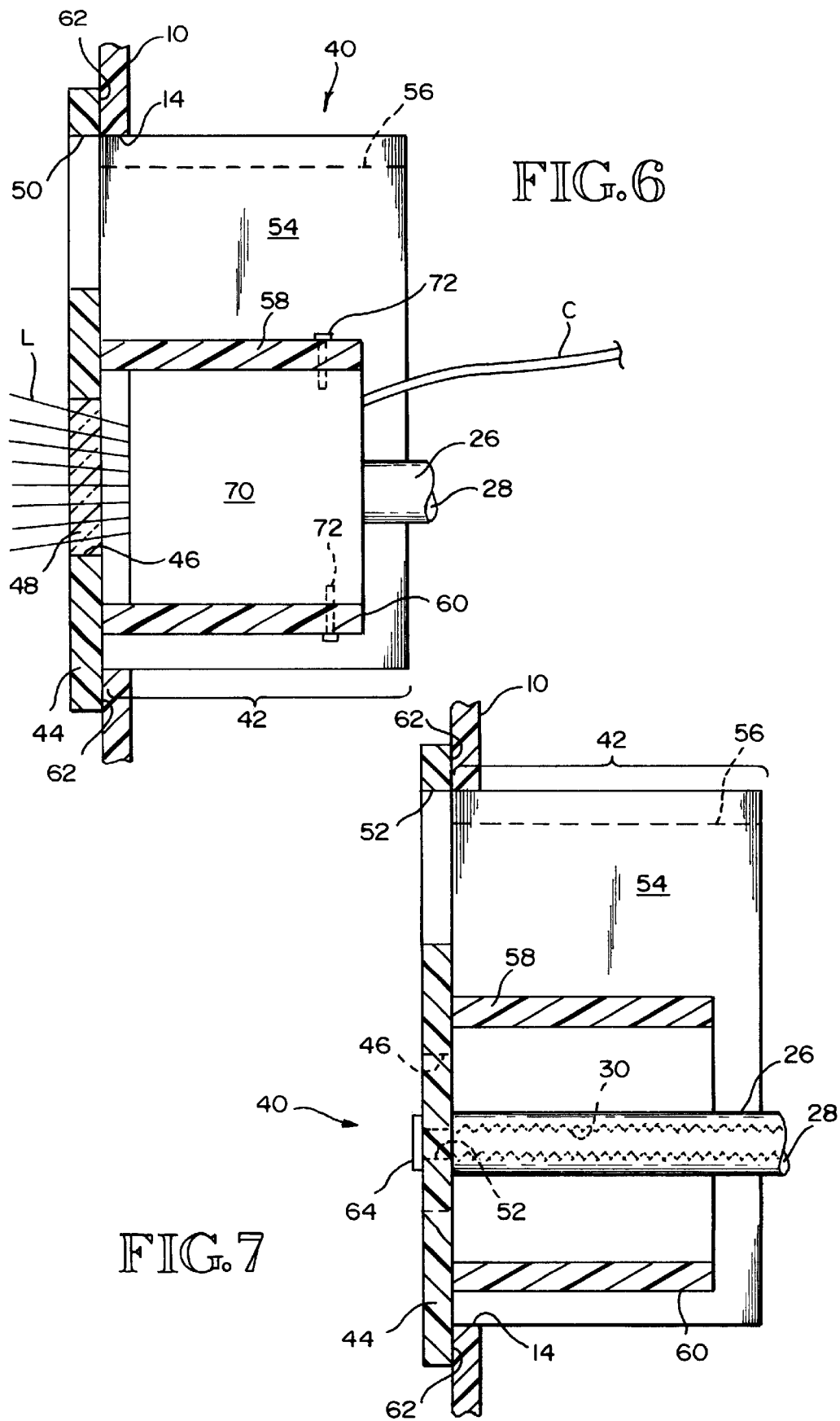

SLIDE-IN TRAY FOR SCANNING DEVICE

TECHNICAL FIELD

This invention relates to hand-held scanning devices and, more particularly, to a device, such as a bar code reader, having an outer housing shell defining an interior space and a tray removably positionable in the space. The tray has an inner portion configured to mount a scanning component, such as a scan engine, and an outer closure portion that sealingly engages an outer surface of the shell when the inner portion is in the interior space. The tray may be removed to replace the scanning component with a different component.

BACKGROUND INFORMATION

Systems for scanning bar codes commonly use hand-held scanning devices, including bar code readers and hand-held computers. These devices have scanning components, such as the scan engine of a bar code reader or an input jack of a hand-held computer that connects to an external scanner. It is desirable for the scanning components of the devices to be easily replaceable to accomplish a repair by replacing a defective component or to change the type of component as operational needs change.

The conception of the present invention began with the recognition of the need for a structure that would permit scanning components to be easily replaced and would also provide a high level of protection for the components while they were in use in the scanning device.

SUMMARY OF THE INVENTION

According to an aspect of the invention, a hand-held scanning device comprises a housing and a removable tray. The housing is sized and shaped to be held in a user's hand. It has an outer shell defining an interior space and an outer opening extending through the shell and communicating with the space. The tray has an inner portion and an outer closure portion with a sealing surface. The inner portion is sized and shaped to be introducible into and removable from the interior space through the opening. The outer closure portion is dimensioned to close the opening, when the inner portion is in the space, with the sealing surface sealingly engaging an outer surface of the shell. The inner portion has a mounting portion configured to removably mount a scanning component.

The invention encompasses various types of scanning devices, including hand-held computers and bar code readers. It is also within the scope of the invention to mount various types of scanning components, including scan engines, input jacks, and radio modules or other communication modules used in a scanning system. It is currently anticipated that the major application of the invention will be the mounting of scan engines in bar code readers.

Whatever the nature of the device and the component mounted therein, the invention includes a number of preferred features. One such feature is a housing that includes a first pair of rails extending along opposite sides of the interior space. The inner portion of the tray includes a second pair of rails positioned to slidably engage the first pair of rails as the inner portion of the tray is being introduced into or removed from the space. Preferably, the rails are keyed to prevent introduction of the tray into the space in other than a desired predetermined orientation.

Another preferred feature is the provision of fastening means for removably securing the closure portion to the housing when the inner portion is in the interior space and the sealing surface is engaging the outer surface of the shell. The fastening means securely holds the sealing surface in sealing engagement with the outer surface. In the currently preferred embodiment, the fastening means comprises at least one boss carried by the housing and positioned to project into the inner portion of the tray and terminate closely adjacent to an inner surface of the closure portion when the inner portion is introduced into the interior space. A fastener hole in the closure portion is aligned with the boss. A fastener is received through the hole and into an opening in the boss to secure the closure portion to the boss.

Still another preferred feature is the inclusion in the closure portion of an access opening sized to receive therethrough a memory card to provide an interface between the scanning component and other elements of the device carried by the housing. When the device is a bar code reader and the scanning component is an optical scanner, the closure portion preferably includes a window positioned to align with the scanner and transparent to light emitted by the scanner. The window and access opening may be provided in combination or separately of each other. The preferred form of the mounting portion comprises first and second mounting walls adjacent to opposite sides of the window and spaced apart a distance to closely receive the scanner therebetween. The access opening is positioned outwardly of one of the walls.

The invention also encompasses a method of increasing the versatility of scanning apparatus and protecting components thereof. According to an aspect of the invention, the method comprises providing a hand-held scanning device and a tray. The scanning device has a housing with an outer shell defining an interior space. An opening extends through the shell and communicates with the space. The tray has an inner portion and an outer closure portion. A first scanning component is mounted on the inner portion. The inner portion with the component mounted thereon is introduced into the interior space. Movement of the inner portion inwardly is continued until a sealing surface of the closure portion sealingly engages an outer surface of the shell and the closure portion closes the opening. When use of a second scanning component is desired, the inner portion is removed from the interior space. The first scanning component is removed from the inner portion of the tray, and the second scanning component is mounted on the inner portion. The inner portion with the second component mounted thereon is introduced into the interior space.

Preferably, the closure portion is removably secured to the housing to securely hold the sealing surface in sealing engagement with the outer surface of the shell. Also preferably, an access opening is provided in the closure portion and is sized to receive therethrough a memory card. After the inner portion is introduced into the interior space, a memory card is inserted into the access opening to provide an interface between the scanning component mounted on the inner portion and other elements of the device carried by the housing.

The invention provides a method and apparatus that increase the versatility of scanning systems and enhance protection of scanning components. The structure of the apparatus of the invention is relatively simple and inexpensive to manufacture and maintain. The method of the invention realizes the high potential of the apparatus for versatility and cost effectiveness. At virtually any location at which the apparatus is in use, the apparatus may be repaired by replacing a defective scanning component with a new component of the same type or adapted to a new use by replacing a scanning component with a new component of a different type. To further increase the versatility, additional trays with differently configured mounting portions may be kept available to allow the replacement of scanning components with differently configured components.

These and other advantages and features will become apparent from the detailed description of the best mode for carrying out the invention that follows.

BRIEF DESCRIPTION OF THE DRAWINGS

In the drawings, like element designations refer to like parts throughout, and:

FIGS. 6 and 7 are sectional views taken along the lines 6—6 and 7—7, respectively, of FIG. 5.

BEST MODE FOR CARRYING OUT THE INVENTION

Figure 1:
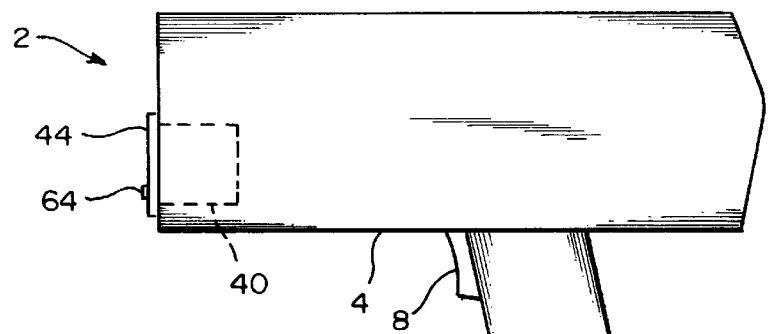
FIG. 1 is an elevational view of a type of hand-held bar code reader into which the apparatus of the invention may be incorporated, showing the preferred embodiment of the tray in partially schematic form.

The drawings illustrate apparatus that is constructed according to the invention and that also constitutes the best mode for carrying out the invention currently known to the applicant. FIG. 1 illustrates a common type of bar code reader 2 into which the tray of the invention is incorporated. The reader 2 is shown for the purposes of illustration. It is intended to be understood that the scanning device of the invention may take various other forms.

Figure 2:
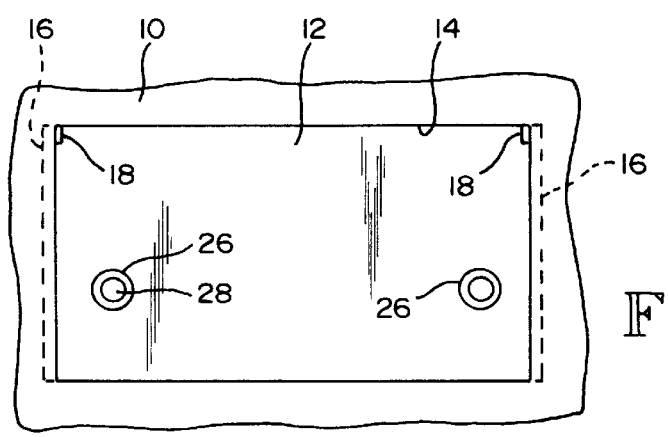
FIG. 2 is a front view of the barrel portion of the reader shown in FIG. 1 with the tray removed, showing the opening through which the inner portion of the tray is received.

Referring to FIG. 1, the bar code reader 2 shown therein has a housing 4 sized and shaped to be held in a user's hand. For this purpose, the housing 4 is provided with a handle 6. A trigger 8 is positioned on an upper portion of the handle 6 for easy operation of the reader 2 in a known manner. Referring to FIGS. 1 and 2, the barrel portion of the housing 4, has an outer shell 10 that defines an interior space 12. An opening 14 extends through the shell 10 and communicates with the space 12.

Referring to FIG. 2, a pair of rails 16 extends along opposite sides of the space 12 on opposite sides of the opening 14. Each rail 16 is in the form of a wall having an outer end secured to the shell 10 at the edge of the opening 14 and extending inwardly therefrom perpendicular to the shell 10 and opening 14. The major portion of each rail wall is flush with the edge of the opening 14 but does not extend into the opening 14. At the top of each rail 16, there is a projection 18 projecting laterally inwardly relative to the opening so that it blocks a small corner portion of the opening 14. The purpose of these projections 18 is to key the rails to rails on the tray, as described further below.

Referring to FIGS. 2, 6, and 7, the housing 4 includes a pair of laterally spaced bosses 26 projecting from an interior portion of the housing 4 toward the opening 14. The bosses may be connected to the shell 10 in various ways, such as by an interior wall of the housing 4 or brackets carried by inner surfaces of the shell 10. Each boss 26 has an axial opening 28 extending inwardly from its free outer end. Preferably, internal threads 30 are provided on the sidewall surface defining the opening 28. The bosses 26 are positioned to interengage with the tray portion of the apparatus to provide fastening means, as described further below.

Figure 3:
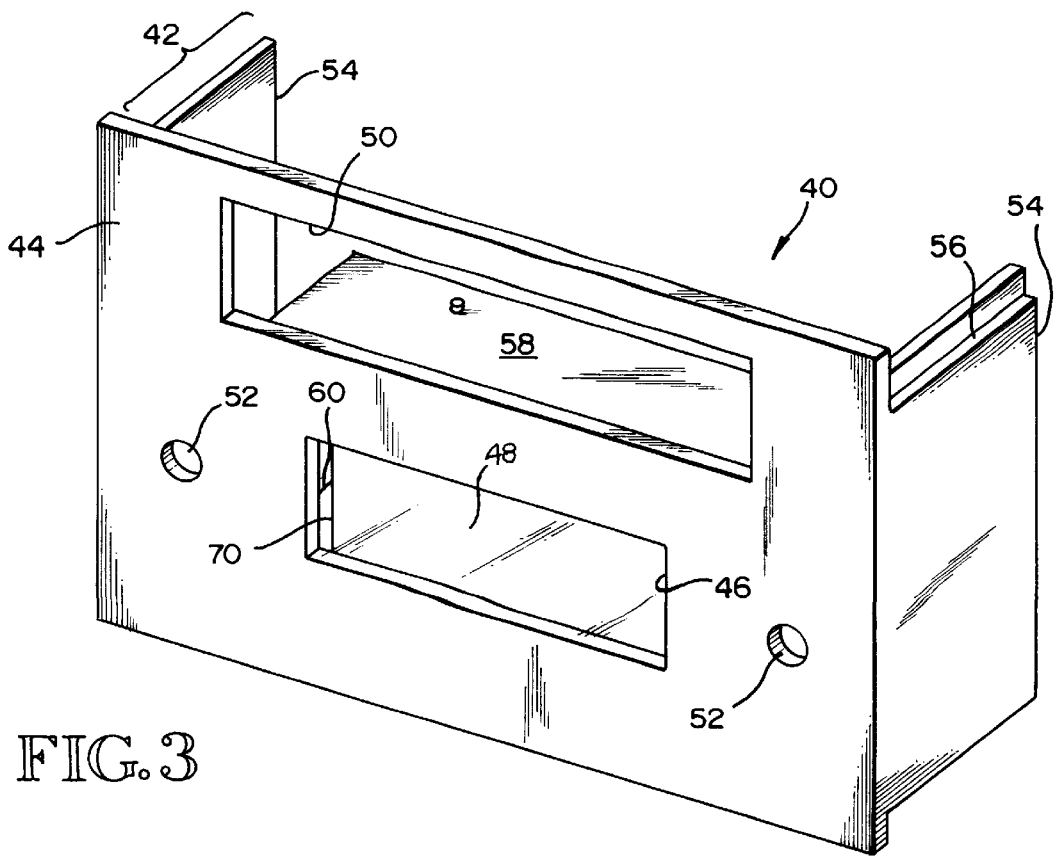
FIG. 3 is a pictorial view looking toward the front and top of the preferred embodiment of the tray.
Figure 4:
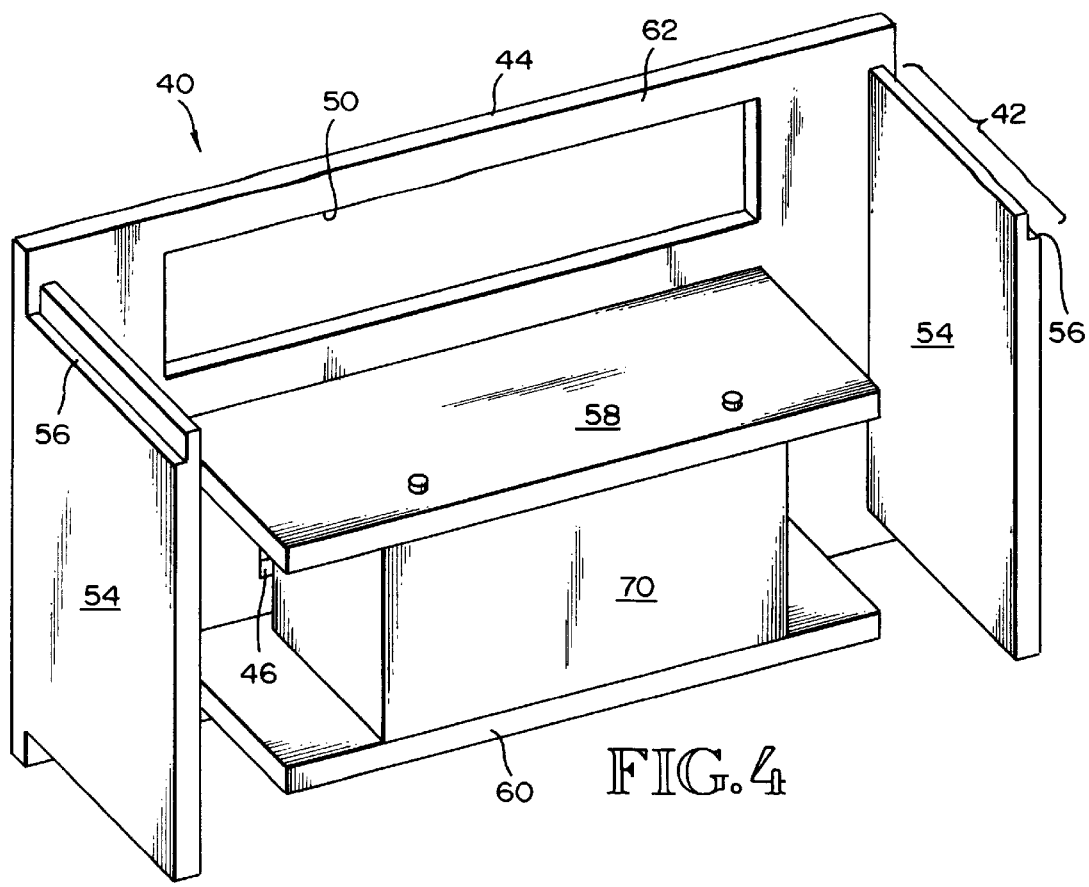
FIG. 4 is a pictorial view looking toward the rear and top of the tray shown in FIG. 3.

Referring in particular to FIGS. 3–7, the preferred embodiment of the tray 40 has a molded plastic body including an inner portion 42 and an outer closure plate 44. As shown in FIGS. 3, 4, and 6, the plate 44 has a window opening 46. Preferably, the opening 46 is closed by a transparent member 48. However, it is within the scope of the invention for the transparent closure 48 to be omitted.

As shown in FIGS. 3–7, the closure plate 44 also preferably has an access opening 50 extending therethrough. In the drawings, this opening 50 is shown with no closure. However, it may be used with various types of closures, such as the spring loaded trap doors commonly found on the disk receiving apertures on the disk drives of computers. The access opening 50 shown in the drawings is sized to receive a memory card. In addition to the window 46 and access opening 50, the illustrated preferred embodiment of the closure plate 44 also includes a pair of fastener holes 52 extending therethrough on opposite sides of the window 46. These holes 52 are positioned to align with the bosses 26 described above.

The inner portion 42 of the tray 40 includes opposite sidewalls 54 extending rearwardly and perpendicularly from opposite side edges of the closure plate 44. Each sidewall 54 has a step 56 formed on the laterally outer surface of an upper portion thereof. Above the step 56, the wall 54 has a reduced thickness. The sidewalls 54 serve as a second pair of rails on the tray 40 that are positioned to slidably engage the rails 16 carried by the housing 4 of the reader 2. The two pairs of rails slidably engage each other as the inner portion 42 of the tray 40 is introduced into and removed from the interior space 12 defined by the shell 10. The reduced thickness upper portions of the rails 54 are configured and positioned to receive the projections 18 on the housing rails 16. This arrangement prevents the tray 40 from being introduced into the interior space 12 in other than the desired right-side-up orientation. If an operator trys to introduce the tray 40 in an upside down orientation, the full thickness lower portions of the rails 54 will be blocked by the projections 18 to prevent introduction of the inner portion 42 into the space 12.

The inner portion 42 of the tray 40 also includes mounting portions. In the illustrated preferred embodiment, the mounting portions include an upper mounting wall 58 and a lower mounting wall 60. These walls 58, 60 are positioned adjacent to opposite sides of the window 46, in the illustrated case the upper and lower sides. The walls 58, 60 are spaced apart a distance to closely receive a scanning component therebetween. As shown, the access opening 50 is positioned outwardly of, more specifically above, the upper mounting wall 58.

Figure 5:
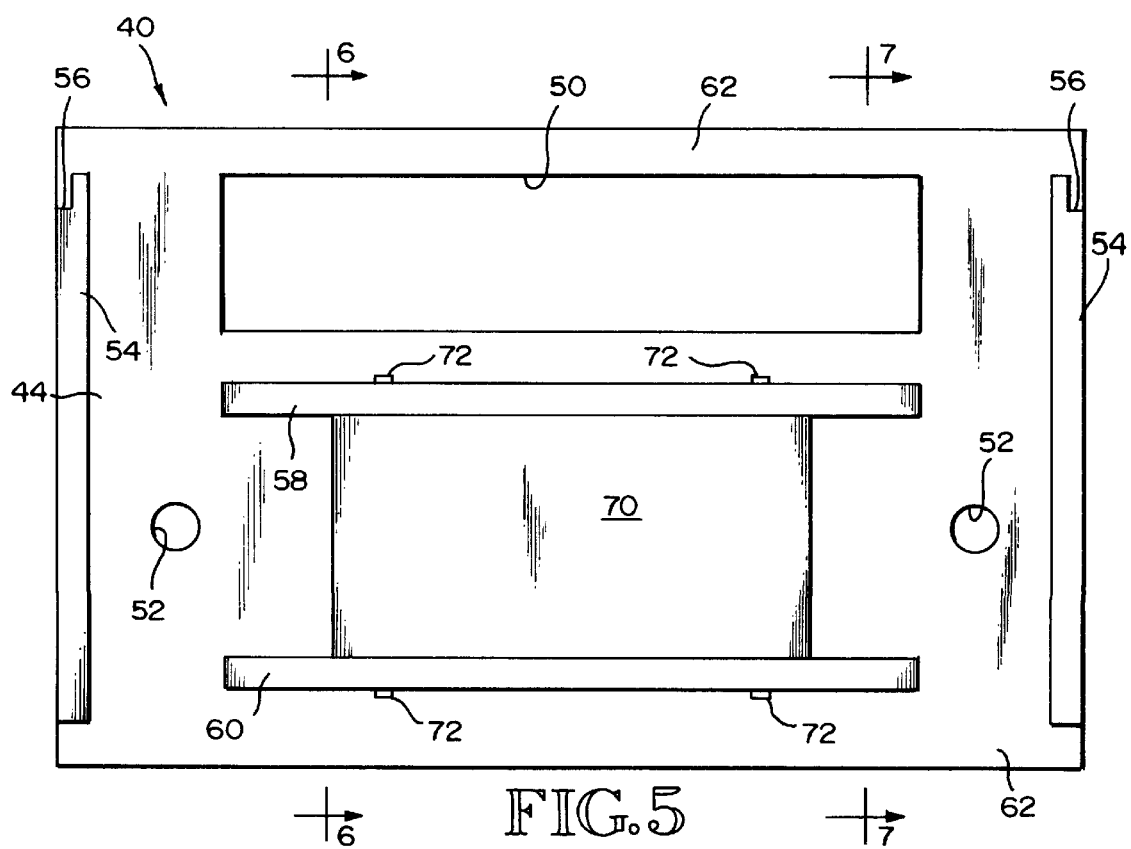
FIG. 5 is an elevational rear view of the tray shown in FIGS. 3 and 4.

Referring to FIGS. 5–7, the portions of the inner surface of the closure plate 44 above the access opening 50 and below the lower mounting wall 60 and bottoms of the rails 54 form a sealing surface 62 positioned to engage outer surface portions of the shell 10, as illustrated in FIGS. 6 and 7. When the inner portion 42 of the tray 40 is introduced into the interior space 12 through the opening 14, it is moved inwardly until the sealing surface 62 engages the outer surface of the shell. In accordance with the invention, the engagement is a sealing engagement to protect a scanning component mounted on the inner portion 42 from environmental contamination during use of the reader 2. As shown, the mating sealing surfaces are at least substantially flat to maintain the simplicity of the structure of the apparatus and help ensure accurate and reliable sealing engagement.

The sealing action may be achieved in various ways, such as by the choice of material from which the closure plate 44, or at least the sealing surface 62 thereof, is made. An example of a suitable material is a soft somewhat rubbery thermoplastic elastomer. An alternative is to provide a die cut gasket along the upper and lower edges of the plate 44.

Whatever the nature of the sealing surface 62, it is desirable to firmly hold the sealing surface 62 in sealing engagement with the shell 10. To accomplish this, the apparatus of the invention preferably includes fastening means for removably securing the closure portion to the housing 4. The preferred embodiment of such means includes the bosses 26 and fastener holes 52 described above. It also includes a fastener 64 for each boss 26. The fastener 64 is illustrated in FIGS. 1 and 7. As shown in FIG. 7, the fastener 64 preferably threadly engages the internal threads 30 of the boss opening 28. The bosses 26 project into the inner portion 42 of the tray 40 on opposite sides of and vertically between the mounting walls 58 and 60. The bosses 26 terminate closely adjacent to the inner surface of the closure plate 44. When the fasteners 64 are tightened, the threaded engagement of the fasteners 64 in the bosses 26 securely holds the sealing surface 62 in sealing engagement with the shell 10.

In accordance with the invention, the sealing surface 62 is securely but removably held against the shell 10. The removablility is necessary to accomplish the goal of the invention of versatility and easy replacement of scanning components. As used herein in connection with the fastening means for fastening the tray 40 to the housing 4, the term "removable" and the like is intended to be understood to mean readily removable with an ease of attachment and detachment at least comparable to the ease of attachment and detachment of the illustrated threaded engagement.

Referring to FIGS. 3–7, a scanning component 70 is mounted on the inner portion 42 between the mounting walls 58, 60. The walls 58, 60 are spaced apart a distance to closely receive the component 70 therebetween. Preferably, the component 70 is removably secured to the walls 58, 60. In this context, the term "removably" has the same meaning as is does in relation to the fastening of the tray 40 to the housing 4. As shown in FIGS. 5 and 6, the fastening means for the components 70 may take the form of four fasteners 72, such as screws, two of which extend through the upper wall 58 and engage an upper portion of the component 70 and two of which extend through the lower wall 60 and engage a lower portion of the component 70. A snap-in engagement could also be provided.

As described above, in the illustrated preferred embodiment, the closure plate 44 includes a window 46, shown in FIGS. 3, 4, 6, and 7. It is anticipated that a primary use of the invention will be for the removable mounting of optical scan engines in bar code readers. The optical scan engine may be of various types, such as the various known types of laser scanners. If the window 46 is provided with a closure 48, the closure 48 should be transparent to light L emitted by the scanner 70. The transmission of the light L through the closure 48 is illustrated in FIG. 6. FIG. 6 also illustrates a flex cable C extending inwardly from the scanner 70. The other end of the cable C (not shown) would normally be connected to the scan data processing components of the reader. The cable C may be carried by the scanner 70 and the inner end attached to the processing components when the tray 40 is attached to the housing 4. Alternatively, it would generally be easier to have the cable C retained in the housing 4 and its outer end attached to the scanner 70 just before the inner portion 42 of the tray 40 is introduced into the space 12 through the opening 14.

The method of the invention comprises providing a hand-held scanning device and a tray, such as the bar code reader 2 and tray 40 shown in the drawings and described above. A first scanning component is mounted on the inner portion 42 of the tray 40. This is accomplished by sliding the component 70 between the mounting walls 58, 60 and securing the four fasteners 72. Then, the inner portion 42 with the component 70 mounted thereon is introduced into the interior space 12 by moving the inner portion 42 inwardly through the opening 14. The inward movement is continued until the sealing surface 62 engages the outer surface of the shell 10. The fasteners 64 are then secured to securely hold the sealing surface 62 in sealing engagement with the shell 10. In the sealing position, the closure plate 44 closes the opening 14. As used herein, the term "closes" indicates that the peripheral portions of the closure plate 44 essentially completely cover the peripheral portions of the opening 14. The opening 14 is closed except to the extent that the window 46 and/or access opening 50 may lack a closure.

After the tray 40 has been secured, the bar code reader may be used to scan bar codes. When use of a second scanning component is desired because the first component is in need of repair, because the use of a different scanning component is desired, or for some other reason, the inner portion 42 is removed from the interior space. This is accomplished by disengaging the fasteners 64 and sliding the tray 40 outwardly until the inner portion 42 is clear of the opening 14. Then, the first scanning component is removed from the inner portion by removing the fasteners 72 and sliding the component 70 out from between the mounting walls 58, 60. Following removal of the first scanning component, another scanning component can be mounted on the inner portion 42 by sliding it between the mounting walls 58, 60 and securing it by means of fasteners 72. Once the second component has been secured to the walls 58, 60, the inner portion 42 is reintroduced into the space 12 and the tray 40 is secured in the same manner as described above.

When the tray 40 is provided with the preferred feature of an access opening 50, a memory card may be introduced following the securing of the tray 40 to the housing 4. The memory card is inserted into the access opening. Once in place, the card provides an interface between the scanning component mounted on the inner portion 42 and other elements of the device carried by the housing 4.

As described above, the method uses the same tray with two different components mounted thereon. It is also within the scope of the invention to replace the entire tray. This might be done, for example, when the mounting portions of the tray are not suitable for the new component or when the tray itself is worn or damaged.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A hand-held scanning device comprising:

a housing sized and shaped to be held in a user's hand, said housing having an outer shell defining an interior space and an outer opening extending through said shell and communicating with said space; and a tray having an inner portion and an outer closure portion with a sealing surface; said inner portion and said outer closure portion being integral with each other; said inner portion being sized and shaped to be introducible into and removable from said interior space through said opening; said outer closure portion being dimensioned to close said opening, when said inner portion is in said space, with said sealing surface sealingly engaging an outer surface of said shell when said inner portion is in said space, said inner portion extending inwardly into said space, perpendicularly from opposite side portions of said outer closure portion, and perpendicularly to said sealing surface; and said inner portion having a mounting portion configured to removably mount a scanning component.

2. A hand-held scanning device comprising:

a housing sized and shaped to be in a user's hand, said housing having an outer shell defining an interior space and an outer opening extending through said shell and communicating with said space; and a tray having an inner portion and an outer closure portion with a sealing surface; said inner portion being sized and shaped to be introducible into and removable from said interior space through said opening, said outer closure portion being dimensioned to close said opening when said inner portion is in said space, with said sealing surface sealing engaging an outer surface of said shell, and said inner portion having a mounting portion configured to removable mount a scanning component;

wherein said housing includes a first pair of rails extending along opposite sides of said space, and said inner portion of said tray includes a second pair of rails positioned to slidably engage said first pair of rails as said inner portion of said tray is being introduced into or removed from said space.

3. The device of claim 2, wherein said rails are keyed to prevent introduction of said tray into said space in other than a desired predetermined orientation.

4. The device of claim 3, further comprising fastening means for removably securing said closure portion to said housing when said inner portion is in said space and said sealing surface is engaging said outer surface of said shell, to securely hold said sealing surface in sealing engagement with said outer surface.

5. The device of claim 4, wherein said fastening means comprises at least one boss carried by said housing and positioned to project into said inner portion of said tray and terminate closely adjacent to an inner surface of said closure portion when said inner portion is introduced into said space, a fastener hole in said closure portion aligned with said boss, and a fastener receivable through said hole and into an opening in said boss to secure said closure portion to said boss.

6. The device of claim 1, further comprising fastening means for removably securing said closure portion to said housing when said inner portion is in said space and said sealing surface is engaging said outer surface of said shell, to securely hold said sealing surface in sealing engagement with said outer surface.

7. A hand-held bar code reader comprising:

a housing sized and shaped to be held in a user's hand, said housing having an outer shell defining an interior space and an outer opening extending through said shell and communicating with said space; and a tray having an inner portion and an outer closure portion with a sealing surface; said inner portion and said outer closure portion being integral with each other; said inner portion being sized and shaped to be introducible into and removable from said interior space through said opening; said outer closure portion being dimensioned to close said opening, when said inner portion is in said space, with said sealing surface sealingly engaging an outer surface of said shell; when said inner portion is in said space, said inner portion extending inwardly into said space, perpendicularly from opposite side portions of said outer closure portion, and perpendicularly to said sealing surface; and said inner portion having a mounting portion configured to removably mount a bar code scan engine.

8. A hand-held bar code reader comprising:

a housing sized and shaped to be in a user's hand, said housing having an outer shell defining an interior space and an outer opening extending through said shell and communicating with said space; and a tray having an inner portion and an outer closure portion with a sealing surface; said inner portion being sized and shaped to be introducible into and removable from said interior space through said opening, said outer closure portion being dimensioned to close said opening, when said inner portion is in said space, with said sealing surface sealingly engaging an outer surface of said shell, and said inner portion having a mounting portion configured to removably mount a bar code scan engine;

wherein said housing includes a first pair of rails extending along opposite sides of said space, and said inner portion of said tray includes a second pair of rails positioned to slidably engage said first pair of rails as said inner portion of said tray is being introduced into or removed from said space.

9. The bar code reader of claim 8, wherein said rails are keyed to prevent introduction of said tray into said space in other than a desired predetermined orientation.

10. The bar code reader of claim 9, further comprising fastening means for removably securing said closure portion to said housing when said inner portion is in said space and said sealing surface is engaging said outer surface of said shell, to securely hold said sealing surface in sealing engagement with said outer surface.

11. The bar code reader of claim 10, wherein said fastening means comprises at least one boss carried by said housing and positioned to project into said inner portion of said tray and terminate closely adjacent to an inner surface of said closure portion when said inner portion is introduced into said space, a fastener hole in said closure portion aligned with said boss, and a fastener receivable through said hole and into an opening in said boss to secure said closure portion to said boss.

12. The bar code reader of claim 7, further comprising fastening means for removably securing said closure portion to said housing when said inner portion is in said space and said sealing surface is engaging said outer surface of said shell, to securely hold said sealing surface in sealing engagement with said outer surface.

13. A hand-held bar code reader comprising:

a housing sized and shaped to be held in a user's hand, said housing having an outer shell defining an interior space and an outer opening extending through said shell and communicating with said space; and a tray having an inner portion and an outer closure portion with a sealing surface; said inner portion being sized and shaped to be introducible into and removable from said interior space through said opening, said outer closure portion being dimensioned to close said opening, when said inner portion is in said space, with said sealing surface sealingly engaging an outer surface of said shell, and said inner portion having a mounting portion configured to removably mount a bar code scan engine;

wherein said mounting portion is configured to mount an optical scanner, and said closure portion includes a window positioned to align with said scanner, said window being transparent to light emitted by said scanner.

14. The bar code reader of claim 13, wherein said closure portion further includes an access opening sized to receive therethrough a memory card to provide an interface between said scanner and other elements of the bar code reader carried by said housing.

15. The bar code reader of claim 14, wherein said mounting portion comprises first and second mounting walls adjacent to opposite sides of said window and spaced apart a distance to closely receive said scanner therebetween, said access opening being positioned outwardly of one of said walls.

16. The bar code reader of claim 13, further comprising fastening means for removably securing said closure portion to said housing when said inner portion is in said space and said sealing surface is engaging said outer surface of said shell, to securely hold said sealing surface in sealing engagement with said outer surface;

wherein said housing includes a first pair of rails extending along opposite sides of said space, and said inner portion of said tray includes a second pair of rails positioned to slidably engage said first pair of rails as said inner portion of said tray is being introduced into or removed from said space; and wherein said rails are keyed to prevent introduction of said tray into said space in other than a desired predetermined orientation.

17. The bar code reader of claim 16, wherein said closure portion further includes an access opening sized to receive therethrough a memory card to provide an interface between said scanner and other elements of the bar code reader carried by said housing.

18. A hand-held bar code reader comprising:

a housing sized and shaped to be held in a user's hand, said housing having an outer shell defining an interior space and an outer opening extending through said shell and communicating with said space; and a tray having an inner portion and an outer closure portion with a sealing surface; said inner portion being sized and shaped to be introducible into and removable-from said interior space through said opening, said outer closure portion being dimensioned to close said opening, when said inner portion is in said space, with said sealing surface sealingly engaging an outer surface of said shell, and said inner portion having a mounting portion configured to removably mount a bar code scan engine;

wherein said closure portion includes an access opening sized to receive therethrough a memory card to provide an interface between said scan engine and other elements of the bar code reader carried by said housing.

19. A method of increasing the versatility of scanning apparatus and protecting components thereof, comprising:

providing a hand-held scanning device having a housing with an outer shell defining an interior space, including extending an opening through said shell communicating with said space;

providing a tray having an inner portion and an outer closure portion integral with said inner portion;

mounting a first scanning component on said inner portion;

introducing said inner portion with said component mounted thereon into said interior space, and continuing to move said inner portion in an inward direction until a sealing surface of said closure portion sealing engages an outer surface of said shell and said closure portion closes said opening, said sealing surface extending perpendicularly to said inward direction; and when use of a second scanning component is desired, removing said inner portion from said interior space, removing said first scanning component from said inner portion, mounting said second scanning component on said inner portion, and introducing said inner portion with said second component mounted thereon into said interior space.

20. The method of claim 19, further comprising removably securing said closure portion to said housing to securely hold said sealing surface in sealing engagement with said outer surface.

21. The method of claim 19, comprising providing an access opening in said closure portion sized to receive therethrough a memory card, and, after introducing said inner portion into said interior space, inserting a memory card into said access opening to provide an interface between the scanning component mounted on said inner portion and other elements of the device carried by said housing.

* * * * *

UNITED STATES PATENT AND TRADEMARK OFFICE
CERTIFICATE OF CORRECTION

PATENT NO: 6,131,815

DATED: Oct. 17, 2000

INVENTOR(S): Robert A. Zigler

It is certified that error appears in the above-identified patent and that said Letters Patent are hereby corrected as shown below:

Claim 1, column 7, line 15, following " shell ", insert -- ; --.
Claim 2, column 7, line 23, following " shaped to be " insert -- held --.
Claim 2, column 7, line 33, before " when " insert -- , --.
Claim 2, column 7, line 34, " sealing engaging " should be
 -- sealingly engaging --.
Claim 2, column 7, line 36, " removable " should be -- removably --.
Claim 8, column 8, line 23, following " shaped to be " insert -- held --.
Claim 18, column 10, line 5, " removable-from " should be
 -- removable from --.
Claim 19, column 10, line 31, " sealing ", second occurrence, should be
 -- sealingly --.

Signed and Sealed this

Eighth Day of May, 2001

Attest:

NICHOLAS P. GODICI

Attesting Officer

Acting Director of the United States Patent and Trademark Office